(12) United States Patent
Richter et al.

(10) Patent No.: US 12,547,358 B2
(45) Date of Patent: Feb. 10, 2026

(54) AUXILIARY MEASUREMENT DISPLAY DEVICE, COMPUTER PROGRAM PRODUCT, MEASUREMENT SERVER, MEASUREMENT SYSTEM AND METHOD

(71) Applicant: ROHDE & SCHWARZ GMBH & CO. KG, Munich (DE)

(72) Inventors: Robert Alexander Uwe Richter, Potsdam (DE); Max Thure Nebendahl, Potsdam (DE); Manaelle Lucie Bret, Bourges (FR); Jeff Al Msanne, Levallois-Perret (FR); Pauline Duard, Draveil (FR); Falk Uebernickel, Lindau (CH); Carolin Valerie Marx, Hamburg (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 0 days.

(21) Appl. No.: 18/169,117

(22) Filed: Feb. 14, 2023

(65) Prior Publication Data
US 2023/0385006 A1 Nov. 30, 2023

(30) Foreign Application Priority Data

May 31, 2022 (EP) .................................... 22176592

(51) Int. Cl.
G06F 3/14 (2006.01)
G06F 1/16 (2006.01)
(Continued)

(52) U.S. Cl.
CPC ................ G06F 3/14 (2013.01); G06F 1/163 (2013.01); G06F 3/011 (2013.01); G01R 13/02 (2013.01)

(58) Field of Classification Search
CPC . G06F 3/14; G06F 3/011; G06F 1/163; G01R 13/02
See application file for complete search history.

(56) References Cited

U.S. PATENT DOCUMENTS

2002/0147799 A1* 10/2002 Alhalabi ................ G09B 23/18
709/250
2014/0249944 A1* 9/2014 Hicks ................... G07G 1/0081
235/383
(Continued)

FOREIGN PATENT DOCUMENTS

EP 1045302 A1 10/2000
EP 3318944 A2 5/2018
(Continued)

OTHER PUBLICATIONS

EP App. No. 22176592.8 Extended European Search Report dated Nov. 22, 2022.

Primary Examiner — Christopher E Leiby
(74) Attorney, Agent, or Firm — BROOKS KUSHMAN P.C.

(57) ABSTRACT

An auxiliary measurement display device, comprises a communication interface configured to receive incoming measurement-related data and transmit outgoing measurement-related data, a display configured to display measurement information, a user interface configured to receive user input, and a controller coupled to the communication interface and the display and the user interface, wherein the controller is configured to control the display to display the measurement information based on the incoming measurement-related data, and wherein the controller is configured to generate the outgoing measurement-related data based on the received user input and transmit the outgoing measurement-related data via the communication interface. In addition, the present disclosure provides a respective computer (Continued)

program product, a measurement server, a respective measurement system and a respective method.

28 Claims, 7 Drawing Sheets

(51) Int. Cl.
*G06F 3/01* (2006.01)
*G01R 13/02* (2006.01)

(56) References Cited

U.S. PATENT DOCUMENTS

| | | | |
|---|---|---|---|
| 2016/0011905 A1* | 1/2016 | Mishra | G06F 8/34 |
| | | | 718/102 |
| 2017/0013950 A1 | 1/2017 | Rieger | |
| 2017/0163354 A1* | 6/2017 | Primerano | H04B 11/00 |
| 2019/0192075 A1* | 6/2019 | Kranz | A61B 5/259 |
| 2020/0064818 A1 | 2/2020 | Lajevardi | |
| 2020/0174041 A1* | 6/2020 | Schaefer | G01R 13/0245 |
| 2021/0216359 A1* | 7/2021 | Rana | G06N 20/00 |
| 2022/0100453 A1* | 3/2022 | Miraj | G10L 15/26 |
| 2023/0047859 A1* | 2/2023 | Eeshwaroju | G10L 21/0232 |
| 2023/0187043 A1* | 6/2023 | Hossain | A61B 5/332 |
| | | | 705/3 |
| 2023/0228803 A1* | 7/2023 | Sun | G01R 31/2603 |
| | | | 324/537 |
| 2024/0266074 A1* | 8/2024 | Smurro | G16H 80/00 |
| 2025/0186258 A1* | 6/2025 | Bischoff | A61F 9/00836 |

FOREIGN PATENT DOCUMENTS

| | | |
|---|---|---|
| EP | 3539800 A1 | 9/2019 |
| EP | 3760039 A1 | 1/2021 |

* cited by examiner

AUXILIARY MEASUREMENT DISPLAY DEVICE, COMPUTER PROGRAM PRODUCT, MEASUREMENT SERVER, MEASUREMENT SYSTEM AND METHOD

CROSS-REFERENCE TO RELATED APPLICATIONS

This application claims foreign priority benefits under 35 U.S.C. § 119(a)-(d) to EP Application 22 176 592.8 filed on May 31, 2022, which is hereby incorporated by reference in its entirety.

TECHNICAL FIELD

The disclosure relates to an auxiliary measurement display device, a respective computer program product, a measurement server, a respective measurement system and a respective method.

BACKGROUND

Although applicable to any type of measurement application, the present disclosure will mainly be described in conjunction with measurement equipment like for example, oscilloscopes, network analyzers, signal generators and the like.

In modern measurement applications, a plurality of measurement devices may be employed and complex setups of such measurement devices may be required. Setting up and documenting a measurement, consequently, may become a cumbersome task.

Accordingly, there is a need for simplifying the management of measurement setups.

SUMMARY

The above stated problem is solved by the features of the independent claims. It is understood, that independent claims of a claim category may be formed in analogy to the dependent claims of another claim category.

Accordingly, it is provided:
An auxiliary measurement display device, comprising a communication interface configured to receive incoming measurement-related data and transmit outgoing measurement-related data, a display configured to display measurement information, a user interface configured to receive user input, and a controller coupled to the communication interface and the display and the user interface, wherein the controller is configured to control the display to display the measurement information based on the incoming measurement-related data, and wherein the controller is configured to generate the outgoing measurement-related data based on the received user input and transmit the outgoing measurement-related data via the communication interface.

Further, it is provided:
A computer program product, comprising instructions that when executed by a controller of an auxiliary measurement display device according to any of the preceding claims, cause the auxiliary measurement display device to receive incoming measurement-related data via a communication interface of the auxiliary measurement display device, control a display of the auxiliary measurement display device to display measurement information based on the incoming measurement-related data, receive user input via a user interface of the auxiliary measurement display device, generated outgoing measurement-related data based on the received user input, and transmit the outgoing measurement-related data via the communication interface.

In addition, it is provided:
A measurement server, comprising a server communication interface configured to receive and transmit measurement-related data, and to communicatively couple the measurement server to at least one measurement device and to at least one auxiliary measurement display device according to the present disclosure, a database configured to store measurement-related data received from at least one of the at least one measurement device, and the at least one auxiliary measurement display device, and a controller for executing a measurement workflow based on the stored measurement-related data.

Further, it is provided:
A measurement system, comprising at least one auxiliary measurement display device according to the present disclosure, and at least one measurement server according to the present disclosure.

In addition, it is provided:
A method for controlling measurement equipment, the method comprising receiving incoming measurement-related data in an auxiliary measurement display device, displaying measurement information based in the incoming measurement-related data via the auxiliary measurement display device, receiving user input at the auxiliary measurement display device, generating outgoing measurement-related data based on the received user input, and transmitting the outgoing measurement-related data via the communication interface.

The present disclosure is based on the finding that handling of conventional measurement setups may be complex and time consuming.

Usually, prior to each measurement, major research is performed by the user on how to actually perform the measurement. Such a preparatory research itself does not include the use of any measurement devices, but still may take most of the time, while the actual measurement is usually finished quite fast.

In conventional measurement setups for creating measurement data and analyzing the measurement, the measurement data is usually stored on data carriers like for example, USB-Sticks. For controlling multiple measurements, Remote Desktop Services connections, RDS, may be used in such setups, to fetch data from a remote measurement devices. Usually, those methods are impractical and inefficient. If a user later needs to operate on the measurement results, he usually has to load the measurement data into separate tools that provide the respective functionality. Such a workflow, where different tools and equipment are not coupled or only loosely coupled e.g., via RDS connections may result in losses of time and information.

The present disclosure provides a solution that on the one hand speeds up the research required prior to performing a measurement task, and on the other hand allows a user to easily manage measurement devices and measurement result data while performing a measurement task.

To this end, the present disclosure provides the auxiliary measurement display device that may interact with a measurement server, wherein the measurement server may in addition interact with at least one measurement device. The auxiliary measurement display device may, therefore, communicate with the at least one measurement device indirectly via the measurement server. In embodiments, the auxiliary measurement display device may also communicate directly with the at least one measurement device. A measurement system according to the present disclosure may, consequently, comprise at least one auxiliary measurement display device, and at least one measurement server. The measurement system may further comprise the at least one measurement device. However, measurement devices are optional, since the measurement system may also be operated with data that is stored in the measurement server.

The auxiliary measurement display device is provided as an aid to users and allows users to interact with measurement-related data and measurement-devices without the need to directly interact with a respective measurement device.

To this end, the auxiliary measurement display device comprises a communication interface. The communication interface may couple the auxiliary measurement display device with a measurement server according to the present disclosure or directly with one or multiple measurement devices, if no measurement server is present.

It is understood, that the communication interface of the auxiliary measurement display device and of the device communication interface of the measurement server may comprise any kind of wired and wireless communication interfaces, like for example a network communication interface, especially an Ethernet, wireless LAN or WIFI interface, a USB interface, a Bluetooth interface, an NFC interface, a visible or non-visible light-based interface, especially an infrared interface. It is further understood, that the auxiliary measurement display device and the measurement server may communicate via an intermediary network with each other, and that such a network may comprise any type of network devices, like switches, hubs, routers, firewalls, and different types of network technologies.

The auxiliary measurement display device further comprises a display and a user interface. It is understood, that the display and the user interface may be provided separately or as a combined device for example, as a touch screen device.

In addition, the auxiliary measurement display device comprises a controller that is coupled to the communication interface, the display and the user interface. The controller at least performs the tasks of controlling the display to display measurement information to the user based on respective incoming measurement-related data, and of transmitting outgoing measurement-related data based on a respective user input. It is understood, that if the display is described as showing or displaying information or data to the user, such an expression is meant to comprise the controller controlling the display to show the respective information or data.

A measurement device may comprise any device that may be used in a measurement application to acquire an input signal or to generate an output signal, or to perform additional or supporting functions in a measurement application. A measurement application, also called measurement setup, may e.g., comprise at least one or multiple different measurement devices for performing electric, magnetic, or electromagnetic measurements, especially on single devices under test. Such electric, magnetic, or electromagnetic measurements may be performed in a measurement laboratory or in a production facility in the respective production line. A measurement application or measurement setup may serve to qualify the single devices under test i.e., to determine the proper electrical operation of the respective devices under test.

Measurement devices to this end may comprise at least one signal acquisition section for acquiring electric, magnetic, or electromagnetic signals to be measured from a device under test, or at least one signal generation section for generating electric, magnetic, or electromagnetic signals that may be provided to the device under test. Such a signal acquisition section may comprise, but is not limited to, a front-end for acquiring, filtering, and attenuating or amplifying electrical signals. The signal generation section may comprise, but is not limited to, respective signal generators, amplifiers, and filters.

Further, when acquiring signals, measurement devices may comprise a signal processing section that may process the acquired signals. Processing may comprise converting the acquired signals from analog to digital signals, and any other type of digital signal processing, for example, converting signals from the time-domain into the frequency-domain.

The measurement devices may also comprise a user interface to display the acquired signals to a user and allow a user to control the measurement devices. Of course, a housing may be provided that comprises the elements of the measurement device. It is understood, that further elements, like power supply circuitry, and communication interfaces may be provided.

A measurement device may be a stand-alone device that may be operated without any further element in a measurement application to perform tests on a device under test. Of course, communication capabilities may also be provided for the measurement device to interact with other measurement devices.

A measurement device may comprise, for example, a signal acquisition device e.g., an oscilloscope, especially a digital oscilloscope, or a vector network analyzer. Such a measurement device may also comprise a signal generation device e.g., a signal generator, especially an arbitrary signal generator or a vector signal generator. Further possible measurement devices comprise devices like calibration standards, or measurement probe tips.

Of course, at least some of the possible functions, like signal acquisition and signal generation, may be combined in a single measurement device.

In embodiments, the measurement device may comprise pure data acquisition devices that are capable of acquiring an input signal and of providing the acquired input signal as digital input signal to a respective data storage or application server. Such pure data acquisition devices not necessarily comprise a user interface or display. Instead, such pure data acquisition devices may be controlled remotely e.g., via a respective data interface, like a network interface or a USB interface. The same applies to pure signal generation devices that may generate an output signal without comprising any user interface or configuration input elements. Instead, such signal generation devices may be operated remotely via a data connection.

In the context of the present disclosure, the expression "measurement-related data" is to be understood as encompassing any type of data that may be relevant to a measurement application. Such data may comprise data that is generated during a measurement, that is needed to set-up a measurement, and that is generated based on measured data. It is understood, that measurement-related data is not limited to this examples. In general, the expression "measurement-related data" in the context of the present disclosure may refer to any data that is exchanged between the auxiliary measurement display device, measurement server, and any measurement device, and any other device present in a measurement application, especially to any data mentioned explicitly in this disclosure.

Measurement-related data may in embodiments comprise configuration data for at least one measurement devices, the measurement server, the auxiliary measurement display device, and any other device present in a measurement application. Such configuration data may comprise for example, parameter values to be set in the respective device for any parameter that may be configured in the device.

The measurement-related data may also comprise measured data i.e., values of a signal as measured by a measurement device in the respective measurement application. The measured data may be provided for example, as a file or as a data set of a predefined length. In embodiments, the measured data may also be provided as a continuous stream of data. Such a stream of data may be provided by the measurement device that is acquiring the respective signal or by the server, if the measured data is stored on the server.

The measurement-related data may also comprise any data that may be generated based on the measured data. Such data may for example refer to graphical representations, like waveforms, of the measured data. Such graphical representations may for example be stored as images or image-based measurement-related data. The generated data may also comprise a documentation for a respective measurement application that may be generated from a template and the measured data.

The measurement-related data may further comprise descriptions or commands that define measurement workflows. Such descriptions or commands refer to single steps that are to be performed in a specific order to complete a measurement workflow. It is understood, that the descriptions or commands may refer to configuring measurement equipment, to controlling (starting/stopping) measurement equipment, and to commanding measurement equipment to provide measurement data for example, to a database or a measurement server. Other descriptions or commands may initiate data analysis functions for example, in the measurement server, but also in a measurement device or the auxiliary measurement display device. Exemplary data analysis functions may comprise detecting signal components or features in the measured data, transforming the measured data, filtering the measured data, and composing a graphical representation of various sets or measured data for example, of two or more different measured signals.

In embodiments, a user may provide user input to the auxiliary measurement display device that defines descriptions or commands of a measurement workflow. The measurement server may store such descriptions or commands for different measurement workflows.

A user may select one of multiple measurement workflows that may be stored in the measurement server or the auxiliary measurement display device via the auxiliary measurement display device. The auxiliary measurement display device may then control the measurement server to execute the respective workflow or execute the respective workflow directly.

The controller of the auxiliary measurement display device and of the measurement server may be provided as a dedicated processing element, like e.g., a processing unit, a microcontroller, a field programmable gate array, FPGA, a complex programmable logic device, CPLD, or the like. The controller may at least in part also be provided as a computer program product comprising computer readable instructions that may be executed by a processing element. In a further embodiment, the controller may be provided as addition or additional function or method to the firmware or operating system of a processing element that is already present in the respective application as respective computer readable instructions. Such computer readable instructions may be stored in a memory that is coupled to or integrated into the processing element. The processing element may load the computer readable instructions from the memory and execute them.

In addition, it is understood, that any required supporting or additional hardware may be provided like e.g., a power supply circuitry and clock generation circuitry.

In embodiments, the auxiliary measurement display device may be provided as a handheld device like for example, a smartphone or a tablet PC. In such an embodiment, the functionality described herein regarding the auxiliary measurement display device may be implemented by a computer program product comprising computer readable instructions, that is executed by a controller or processor of the respective handheld device.

The computer program product may for example be provided as an executable file or binary that may be loaded onto the handheld device and that may be executed by an operating system of the handheld device.

In another embodiment, the computer program product may be provided as a script-based computer program product. Such a computer program product may for example be provided as JavaScript program that may be executed within a browser program that is executed by the operating system of the handheld device. Such a computer program product may for example be delivered or served by the measurement server when a user visits a website hosted on the measurement server, or by a measurement device that comprises a respective server component.

The measurement server may be a dedicated server that may be implemented as a single hardware device. The measurement server may also be implemented as a distributed system comprising a plurality of servers, optionally with a load balancer, that distributes the load over the servers. The measurement server may also be provided as a so-called cloud or cloud-server system that implements the measurement server via virtualization methods independently of the underlying hardware. In embodiments, the measurement server may also be implemented as a respective addon component in a measurement device.

During operation of the auxiliary measurement display device, the incoming measurement-related data may be provided by the measurement server or directly by measurement devices to the auxiliary measurement display device.

With the help of the auxiliary measurement display device, in an arrangement with multiple measurement devices or with remotely placed measurement devices, a user may receive the incoming measurement-related data centrally with the auxiliary measurement display device for all related measurement devices.

Further, via the outgoing measurement-related data, the user may control the measurement server or the measurement devices from a single device, without the need to physically interact with every single measurement device.

With the measurement system according to the present disclosure, the user of the auxiliary measurement display device not necessarily has to be in the same place as the measurement devices. Instead, the user may remotely manage measurement devices or operate on data that is already stored.

Further embodiments of the present disclosure are subject of the further dependent claims and of the following description, referring to the drawings.

In an embodiment, the measurement information displayed by the display may comprise at least one of a measurement device list, and measurement result data, and measurement device configuration information.

The measurement information that may be displayed to the user may comprise different types of information.

In an environment with multiple measurement devices, the measurement information may for example comprise a measurement device list of available measurement devices. Such a measurement device list may in an embodiment comprise all measurement devices that may be accessed directly or via the measurement server with the auxiliary measurement display device.

In other embodiments, the measurement device list may comprise only such measurement devices that are included in a respective test setup. A user may for example own a plurality of measurement devices. The user may, however, only configure a subset of his measurement devices to participate in a measurement task. In such a case, the measurement device list may only comprise the subset of measurement devices.

Of course, if the measurement device list shows all measurement devices that a user has access to, the user may create a respective test setup that only includes some of the available measurement devices with the auxiliary measurement display device.

When working with the auxiliary measurement display device, the user may for example select one or multiple auxiliary measurement display devices from the measurement device list. In a respective mode of operation of the auxiliary measurement display device any consecutive user input may be applied to or related to the selected auxiliary measurement display devices.

The measurement information that may be displayed to the user may also comprise measurement result data. The term "measurement result data" may refer to any type of data that refers to the results obtained by a measurement with a measurement device. Such measurement result data may for example comprise measurement results as waveform data that may be shown in a diagram or as tabular data that may be shown in a table on the display.

The measurement information may also comprise measurement device configuration data. The measurement device configuration data may refer to any setting or configuration parameter of a respective measurement device and may indicate value of the respective setting or configuration parameter in the measurement device.

The measurement device configuration data may also comprise information on the measurement devices used for a specific measurement task or application and on how to set-up the single measurement devices for the respective measurement task or application.

Summing up, the measurement information provides the user with all the information that is available from different measurement devices in a single access point i.e., in the auxiliary measurement display device.

In a further embodiment, the user input may comprise at least one of a measurement device selection, and a measurement device configuration input, and a measurement device control instruction, and a measurement result storage instruction, and a measurement result data manipulation instruction.

Of course, the auxiliary measurement display device may not only be used by a user to access or view the measurement information. The user may also use the auxiliary measurement display device to configure the measurement devices and to perform other functions during a measurement.

The user input may, therefore, comprise a measurement device selection. Such a measurement device selection may select one or multiple of the available measurement devices for further controlling or operation. The following user input may then be applied to the selected measurement devices. The measurement server may receive measurement-related data that is generated by the auxiliary measurement display device based on the user input and control the measurement device accordingly, or the measurement-related data that is generated by the auxiliary measurement display device based on the user input may be transmitted directly to the measurement device.

The user input may also comprise a measurement device configuration input. With such a measurement device configuration input the respective measurement device or measurement devices may be configured remotely by the user. The user may for example select one of the measurement devices from a list shown on the display, and may then select a configuration mode for the selected measurement device. The display may then show all available configuration options to the user and the user may modify the settings or options respectively. After modifying settings or options, the controller may output respective outgoing measurement-related data, which may then result in the updated configuration being applied in the respective measurement device.

The user input may comprise a measurement device control instruction. Such a measurement device control instruction may for example serve to remotely control a measurement device. With a measurement device control instruction, the user may, therefore, control any aspect of the measurement device as if the user was controlling the measurement device locally via the user interface of the measurement device itself. A user may for example use the measurement device control instruction to start a measurement, and stop a measurement.

The user input may also comprise a measurement result storage instruction. Such a measurement result storage instruction may for example be used to instruct the auxiliary measurement display device or a measurement server or a measurement device to store measurement results that may be recorded by a measurement device or that are currently shown on the display of the auxiliary measurement display device. Storing the measurement results may comprise at least one of storing raw data values, and storing a graphical representation of the measurement results for example, as a screenshot or diagram of the measurement results. Of course, the user may also provide additional information for storing the measurement results. The user may for example provide a file name for the file comprising the measurement data that is stored. The user may also provide additional information like explanations together with the measurement data.

The user input may also comprise a measurement result data manipulation instruction. Such a measurement result data manipulation instruction may be used by the user to manipulate the measurement data, especially prior to storing the measurement data. The measurement result data manipulation instruction may, therefore, comprise at least an instruction to filter the measurement results, to zoom the measurement results, to pan the measurement results, and an instruction to select specific values sequences or measured signals for displaying on the display, for example if a multi-channel measurement device is used, but the user only wants to see the measurement data of specific channels. Zoom and pan instructions may for example be input by two-finger gestures on a touch screen or via two-handed gestures in free space.

In embodiments, sets of setting data or control data may be stored in the auxiliary measurement display device, in the measurement server or in one or multiple the measurement devices. Such sets may refer to a single measurement device or to multiple measurement devices. A user may select or activate a set via the user interface. The auxiliary measurement display device or the measurement server or the measurement device may then implement the settings indicated by the setting data or control data.

The sets allow a user to quickly recreate a measurement setup or reconfigure measurement equipment into a defined state that is needed for a respective measurement task. Especially, when a measurement task or measurement setup is to be repeated, the sets allow quickly setting up the measurement equipment without the need to look up all single settings in a test documentation.

The sets may be provided with additional information, like for example with descriptions and images of how to connect the measurement equipment and the DUT. Such information and images may be provided to the user prior to selecting or activating a respective set.

In yet another embodiment, the user interface may comprise at least one of a touch screen, and a gesture-based user interface, and a voice-controlled user interface, and a keyboard, and a mouse, and an application-specific user input device.

The user interface of the auxiliary measurement display device may comprise one or multiple types of interfaces that allow the user to interact with the auxiliary measurement display device.

The user interface may comprise buttons and switches, a keyboard, a mouse, a touchpad or a track point. An application-specific user input device may for example comprise the user input of a measurement device or a dedicated keyboard with a special layout.

The user interface may also combine the display with a touch interface in a touch screen. The user may perform any input on the display via the touch interface. The auxiliary measurement display device may also display an on-screen keyboard for the user to perform text-based input or may perform a recognition of hand-written input.

The user interface may further comprise a gesture-based user interface. Such a gesture-based user interface allows a user to perform his input via gestures. It is understood, that the gestures may for example be drawn by the user on the touch screen.

In another embodiment, the gestures may be performed by the user with his hands in mid-air. In such an embodiment, the display may comprise a virtual reality headset for displaying the measurement information to the user. With a virtual reality headset as display, a user may also configure multiple display units that may be freely positioned in a virtual space and may each be configured to display a specific measurement information. Of course, the user interface may also be configured as virtual user interface elements that may also be positioned freely in the virtual space with the display units.

The user interface may further comprise a voice-controlled user interface. Such a voice-controlled user interface may for example be used to input specific commands as user input into the auxiliary measurement display device. The voice-controlled user interface may also be used to input data instead of commands into the auxiliary measurement display device. A user may for example provide additional information that is to be stored as text with a screenshot or an image of a diagram via the voice-controlled user interface.

In an exemplary embodiment, the user may control the auxiliary measurement display device to store a screenshot of measurement result data with additional information with the following command:

"Store screenshot of current diagram as screenshot1 with text: This is diagram 1."

As a result, a file with name "screenshot1" may be stored and the additional text "This is diagram 1" may be stored alongside the file.

The additional text may either be stored as voice message or a voice recognition may be performed. If a voice recognition is performed, the voice recognition may be performed either by the controller of the auxiliary measurement display device or at a remote server or service, especially at the measurement server.

In a further embodiment, the auxiliary measurement display device may be comprised in or embodied as a tablet PC or a smartphone.

As indicated above, if the auxiliary measurement display device is embodied as a tablet PC or smartphone, the functionality of the auxiliary measurement display device may be provided by an application that may be executed on the tablet PC or smartphone, or may be provided by a website or a JavaScript program that is executed by a browser application on the tablet PC or Smartphone.

In an embodiment, the auxiliary measurement display device may comprise a forearm support element configured to being releasably attached to a forearm of a user, and a device holder that is coupled to the forearm support element and that is configured to hold at least the display.

The forearm support element allows releasably attaching the auxiliary measurement display device to the forearm of a user, while the device holder that is coupled to the forearm support element may hold at least the display of the auxiliary measurement display device.

Especially, if the auxiliary measurement display device is embodiment as tablet PC or smartphone, the user may carry the auxiliary measurement display device on his forearm or wrist and easily access the auxiliary measurement display device when required.

The forearm support element and the device holder may be movably coupled to each other, such that a user may position the device holder with the display as required. To this end, a pivotable joint or a pivot joint coupling may be used to couple the device holder with the forearm support element.

In embodiments, the forearm support element and the device holder may be provided as a single device for example, as a smartphone arm holder, especially as a bag on a strap with a transparent cover.

In another embodiment, the forearm support element may comprise at least one of a belt, and a clamp.

A belt or strap with a respective belt buckle may easily be adjusted by a user to the size of his forearm. A clamp may provide a rigid support for the auxiliary measurement display device. The clamp may for example be formed with a longitudinal opening or slot from a flexible material, such that a user may push open the clamp top insert his forearm. The clamp may also be formed as a half shell and may be combined with a belt or strap.

In yet another embodiment, the auxiliary measurement display device may comprise a support element configured to be releasably attached to a supporting structure like for example, a desk or table, and a device holder that is coupled to the support element and that is configured to hold at least the display.

The support element allows releasably attaching the auxiliary measurement display device to a desk or table for example, at the work place of the user, while the device holder that is coupled to the support element may hold at least the display of the auxiliary measurement display device.

Especially, if the auxiliary measurement display device is embodiment as tablet PC or smartphone, the user may setup the auxiliary measurement display device on his desk and easily access the auxiliary measurement display device when required.

The support element and the device holder may be movably coupled to each other, such that a user may position the device holder with the display as required. To this end, a pivotable joint or a pivot joint coupling may be used to couple the device holder with the support element.

The support element may also be provided as a multi joint arm-like element that may be coupled to a desk with a clamp and that as multiple joints that are each rotatable in at least one direction.

In an embodiment, the auxiliary measurement display device may be embodied in a measurement device, for example an oscilloscope. The display may be the display of the measurement device, and the user interface may be the user interface of the measurement device. In such an embodiment, a single measurement device may serve as a kind of remote control for the full measurement setup. The measurement device in such an embodiment may also provide the functionality of the measurement server, if no dedicated measurement server is available.

In a further embodiment, the controller of the measurement server when executing the measurement workflow may perform at least one of:
- transmitting configuration commands to the at least one measurement device for configuring the at least one measurement device;
- transmitting control commands to the at least one measurement device;
- requesting measurement data from the at least one measurement device;
- requesting image data from the at least one measurement device, the image data representing the current screen of the at least one measurement device;
- evaluating the requested measurement data;
- generating a documentation based on at least one of the transmitted configuration commands, and the transmitted control commands, and the requested measurement data, and the requested image data; and
- transmitting at least one of the measurement data, and the evaluation results of evaluating the requested measurement data, and the generated documentation.

In order for the controller to execute the workflow, a definition of the workflow may be stored in the measurement server. Of course, in other embodiments, the definition of the workflow may also be stored in a different location, like for example in the auxiliary measurement display device or in a measurement device. The explanations provided herein about the measurement server executing or performing a workflow apply mutatis mutandis to the workflow being executed or performed by the auxiliary measurement display device or the measurement device.

The definition of the workflow may comprise a data measurement plan or guide, that lists the single steps that are required to perform the respective workflow. When executing a workflow, the controller may then perform all steps of the data measurement plan or guide, as indicated.

It is understood, that at least some of the steps may also require a user input. Such steps may indicate if the controller should suspend the workflow until the user input is received or not. The term "user input" in the context of a workflow may refer to any kind of user input to be input for example at one of the measurement devices or at the auxiliary measurement display device.

The measurement server may provide a workflow editor to the user. Such a workflow editor may allow a user to graphically or textually define the single steps of the workflow. The workflow editor may for example be provided as a website or web-based editor that allows cooperatively working on the workflow at the same time for multiple users. The auxiliary measurement display device may be used to access the workflow editor. The communication regarding the workflow editor may be a kind of transmission of measurement-related data.

The measurement server may allow users to store finished workflows and to load stored workflows for further editing or for execution.

As indicated above, a workflow defines specific steps or tasks that are to be performed for performing a measurement task.

In the following some of the possible steps are described. It is understood, that a workflow is not limited to the steps described here and that other steps are also possible.

A possible workflow step comprises transmitting configuration commands to the at least one measurement device. The configuration commands serve for configuring the at least one measurement device as required for the respective measurement task. When defining a workflow, the user may manually define all parameters of the configuration commands. However, modern measurement devices provide a large number of configurable parameters. A user may therefore also read a configuration from a measurement device and store the parameters of the respective configuration in a configuration command for a workflow. This allows a user to configure the device he is used to in the way he knows best and then retrieve the full configuration of the device to use it in a workflow in the future.

Another step of a workflow may comprise transmitting control commands to the at least one measurement device. The control commands may for example indicate to the at least one measurement device to start or stop a measurement. In case of signal generators being used in a measurement setup, such signal generators are also to be seen as measurement devices. The control commands may comprise indicating to such signal generators to start generating a signal or stop generating a signal.

A further step may comprise requesting measurement data from the at least one measurement device. The measurement data may then for example be stored in the measurement server for further processing or evaluation.

Another step may comprise requesting image data from the at least one measurement device. Image data may represent the current screen of the at least one measurement device and may be seen as a kind of screenshot of the measurement device.

In another step, the requested measurement data may be evaluated. Evaluating may comprise any type of processing of the measurement data that yields a required or desired result. Evaluating may comprise for example, identifying specific signal components in the measured data, or transforming the measured data, or filtering the measured data. Of course, multiple evaluation functions may be applied to the measured data to retrieve an evaluation result.

Evaluation functions may also be defined in a scripting language like for example, JavaScript or Python, by a user. The user may define and store such evaluation functions to operate on the measurement data. Of course, the user may also include libraries and functions from other sources in such scripted evaluation functions. This allows the user to include for example, artificial intelligence libraries or functions in his evaluation functions.

A step may comprise generating a documentation based on at least one of the transmitted configuration commands, and the transmitted control commands, and the requested measurement data, and the requested image data. The documentation may be generated based on document templates that may be filled with the required data by a respective templating engine. The data to be filled in the template may refer to any data or information of any of the steps of the workflow.

A template may for example be filled with information about the setup of the measurement system, with information about the configuration of the single measurement devices, with information and screenshots of the measured data, and with evaluation results regarding the measured data. The final document will then include all details as defined for the respective template. Of course, the user may still amend the final document to correct errors or to include further details.

In an embodiment, the computer program product may further comprise instructions that when executed by the controller, cause the auxiliary measurement display device to display measurement information that comprises at least one of a measurement device list, and measurement result data, and measurement device configuration information.

In another embodiment, the computer program product may further comprise instructions that when executed by the controller, cause the auxiliary measurement display device to receive a user input that comprises at least one of a measurement device selection, and a measurement device configuration input, and a measurement device control instruction, and a measurement result storage instruction, and a measurement result data manipulation instruction.

In a further embodiment, the computer program product may further comprise instructions that when executed by the controller, cause the auxiliary measurement display device to receive user input via at least one of a touch screen, and a gesture-based user interface, and a voice-controlled user interface, and a keyboard, and a mouse, and an application-specific user input device.

BRIEF DESCRIPTION OF THE DRAWINGS

For a more complete understanding of the present disclosure and advantages thereof, reference is now made to the following description taken in conjunction with the accompanying drawings. The disclosure is explained in more detail below using exemplary embodiments which are specified in the schematic figures of the drawings, in which.

In the figures like reference signs denote like elements unless stated otherwise.

DETAILED DESCRIPTION OF THE DRAWINGS

Figure 1:
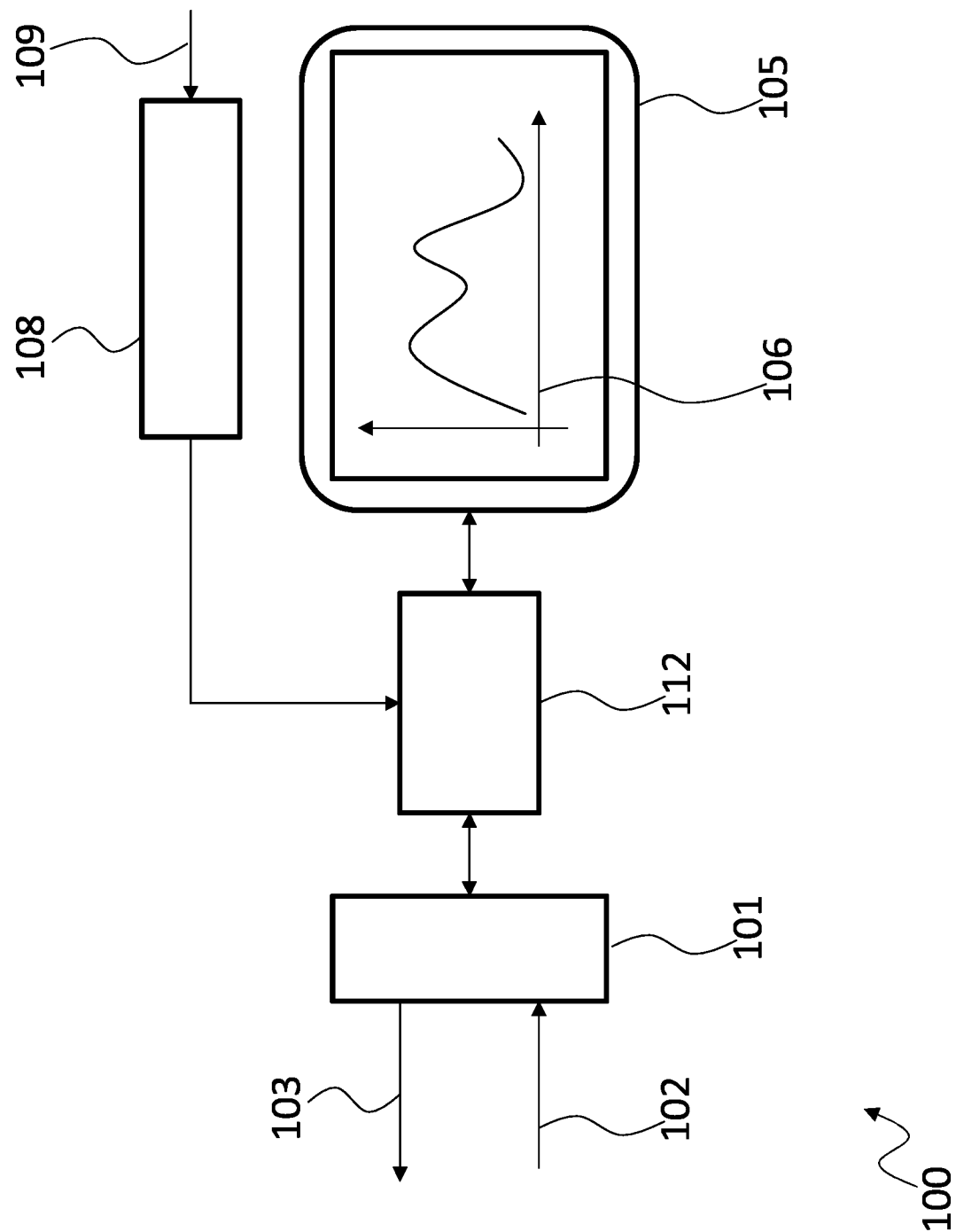
FIG. 1 shows a block diagram of an embodiment of an auxiliary measurement display device according to the present disclosure.

FIG. 1 shows a block diagram of an auxiliary measurement display device 100. The auxiliary measurement display device 100 comprises a communication interface 101 that is coupled to a controller 112. The controller 112 is further coupled to a display 105 and a user interface 108.

The communication interface 101 severs for receiving incoming measurement-related data 102 and transmit outgoing measurement-related data 103. The display 105 may display measurement information 106 to a user, and the user interface 108 may receive user input 109 from the user. In embodiments, the display 105 and the user interface 108 may be integrated into a single device, like a touch-screen device. It is understood, that the touch-screen device may be complemented by additional user input elements, like buttons, a voice input and a gesture input.

The controller 112 controls the display 105 to display the measurement information 106 based on the incoming measurement-related data 102. In FIG. 1, the measurement information 106 is displayed as a diagram with a waveform. It is understood, that any other form of displaying the measurement information 106, like a tabular form, is also possible, and that the measurement information 106 may also comprise other types of information, like information about settings of a measurement device or a screenshot of the measurement device. The measurement information 106 displayed by the controller 112 on the display 105 may for example comprise a measurement device list, and measurement result data, and measurement device configuration information.

Figure 2:
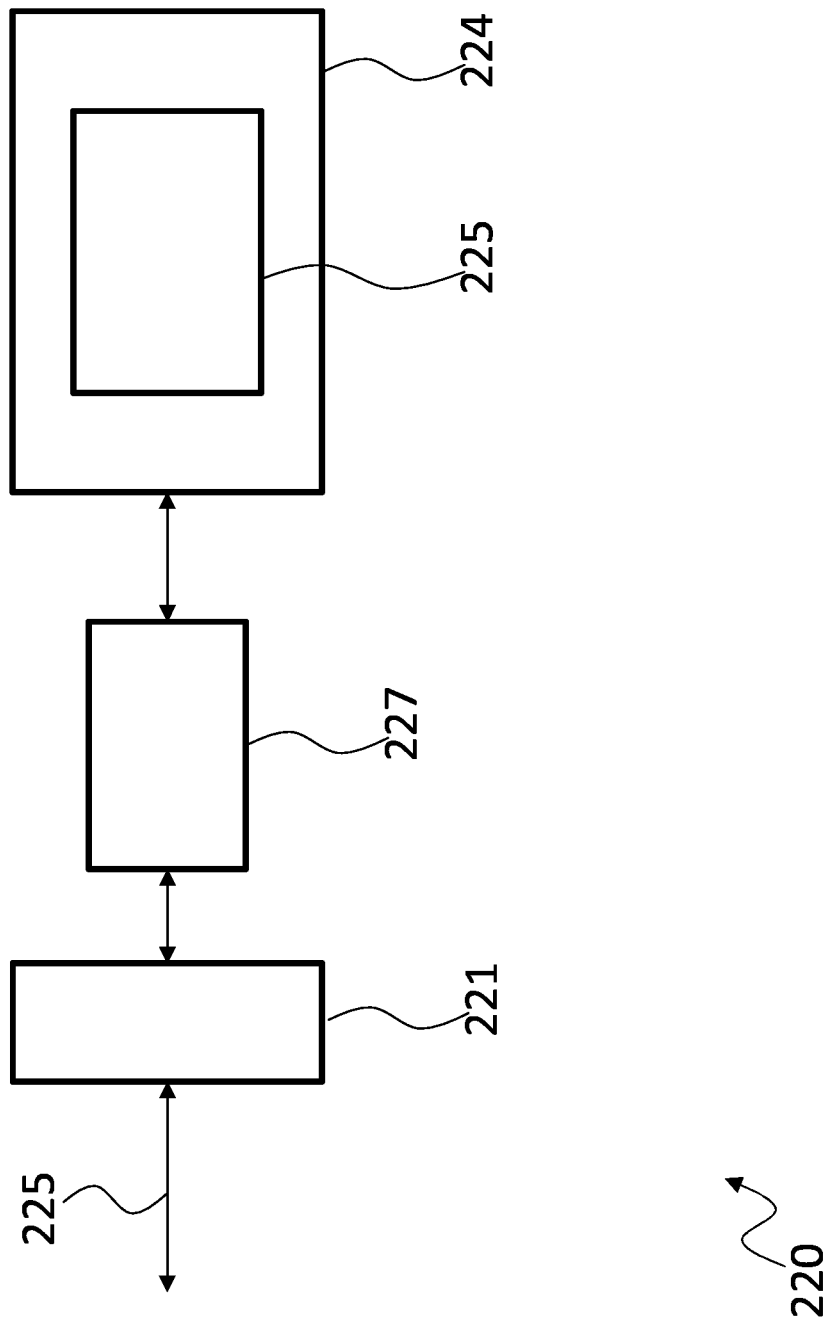
FIG. 2 shows a block diagram of an embodiment of a measurement server according to the present disclosure.

The controller 112 may also generate the outgoing measurement-related data 103 based on the received user input 109 and transmit the outgoing measurement-related data 103 via the communication interface 101, for example to a measurement server as shown in FIG. 2.

The user input 109 may comprises at least one of a measurement device selection, and a measurement device configuration input, and a measurement device control instruction, and a measurement result storage instruction, and a measurement result data manipulation instruction.

In embodiments, the auxiliary measurement display device 100 may be comprised in or may be provided as a tablet PC or a smartphone.

FIG. 2 shows a block diagram of a measurement server 220. The measurement server 220 comprises a server communication interface 221 that is coupled to a controller 227. The controller 227 is further coupled to a database 224.

The server communication interface 221 receives and transmits measurement-related data 225 for example, to at least one measurement device or to at least one auxiliary measurement display device of a respective measurement application. The database 224 stores the measurement-related data 225 received from at least one of the at least one measurement device, and the at least one auxiliary measurement display device.

It is understood, that the measurement-related data 225 may be provided directly from an auxiliary measurement display device or a measurement device to the controller 227 for operating on the measurement-related data 225. In other embodiments, the controller 227 may operate at least in part on the measurement-related data 225 from the database 224. The controller 227 may for example execute a measurement workflow based on the received and/or stored measurement-related data.

When executing the measurement workflow, the controller 227 may for example transmit configuration commands to at least one measurement device for configuring the at least one measurement device, transmit control commands to at least one measurement device to start or stop a measurement, request measurement data from at least one measurement device, and request image data from at least one measurement device. The image data may represent the current screen or a section of the screen of the at least one measurement device. The controller 227 may also evaluate the requested measurement data, generate a documentation based on at least one of the transmitted configuration commands, and the transmitted control commands, and the requested measurement data, and the requested image data, and transmit at least one of the measurement data, and the evaluation results of evaluating the requested measurement data.

In embodiments, the database 224 may not be present in the measurement server 220. Instead, the database 224 may be provided as external database, that may be accessed for example, via a data network. In such embodiments, the measurement devices and auxiliary measurement display devices may store data directly in the database.

Figure 3:
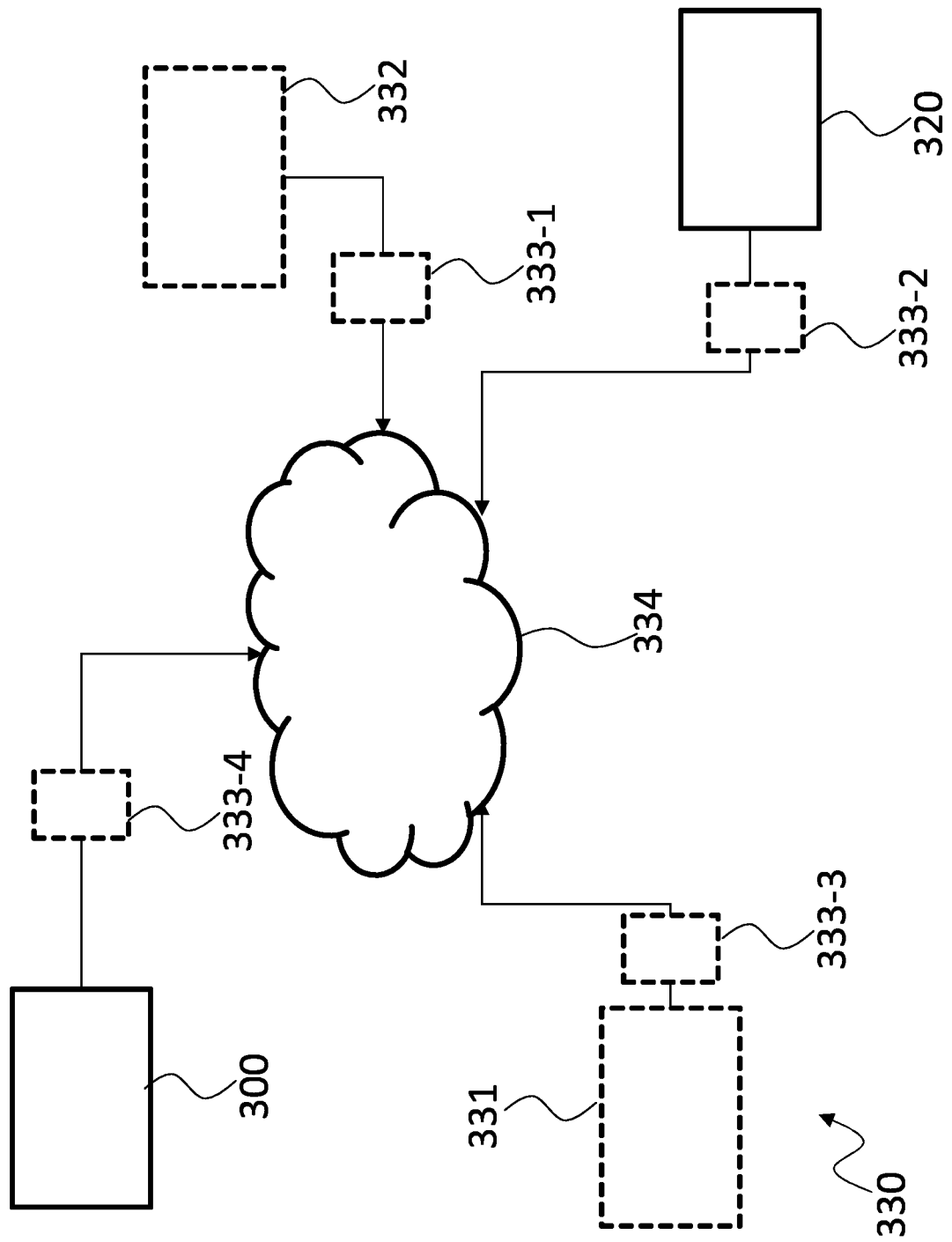
FIG. 3 shows a block diagram of an embodiment of a measurement system according to the present disclosure.

FIG. 3 shows a block diagram of a measurement system 330. The measurement system 330 exemplarily comprises an auxiliary measurement display device 300. It is understood, that any number of auxiliary measurement display devices may be present in the measurement system 330. The measurement system 330 further comprises a measurement server 320. It is understood, that more than one measurement server may be provided in the measurement system 330.

The auxiliary measurement display device 300 and the measurement server 320 are communicatively coupled to each other via a network 334.

As optional elements, the measurement system 330 may comprise a database 331, or multiple databases, and at least one measurement device 332. The database 331 may be provided in case, that the measurement-related data is not to be stored in the measurement server 320.

In embodiments, the measurement device 332 is not required, because the measurement-related data may be pre-stored in the measurement server 320 or a database 331. In other embodiments, at least one measurement device 332 may be provided in the measurement system 330.

It is understood, that the measurement server 320, the auxiliary measurement display device 300, the measurement device 332 and the database 331 may be embodied according to any of the embodiments described in this disclosure.

The network 334 may be a local network on-premises at a users' location, for example at a development or production site, where the user sets-up a measurement arrangement. In other embodiments, the network 334 may be a public network like the internet.

The measurement system 330 may further comprise optional firewalls 333-1, 333-2, 333-3, 333-4, wherein one of the firewalls 333-1, 333-2, 333-3, 333-4 may be provided for each device that is coupled to the network 334. The firewalls 333-1, 333-2, 333-3, 333-4 may especially be provided in case that the network 334 is a public network. The firewalls 333-1, 333-2, 333-3, 333-4 may in an embodiment also be integrated into the respective network-connected devices. In embodiments, a single device may provide the firewall functionality to a plurality of other devices that are coupled to each other in a local network, and attached to the network 334 via the firewall device.

The firewalls 333-1, 333-2, 333-3, 333-4 may protect the devices coupled to the network 334 from any external non-authorized access. In addition, the firewalls 333-1, 333-2, 333-3, 333-4 may also implement a VPN between all devices that are coupled to the network 334. With such a VPN, the data that is communicated between the devices is encrypted and may be securely transported via the public network without external sources being able to access the data.

In embodiments, the auxiliary measurement display device 300 may be provided in the measurement device 332 using the display and user interface of the measurement device 332. Such an embodiment is especially beneficial if multiple measurement devices are provided in a measurement application and the user may easily access only one of the measurement devices for example, because it is located on his desk.

In other embodiments, the display of the auxiliary measurement display device 300 may be provided as virtual reality headset. The user may be put into an open virtual space that allows the user to feely place a plurality of virtual displays. In such a virtual space, the user may assign different content to each one of the virtual displays, and the controller of the auxiliary measurement display device 300 may manage the displaying of the respective data on each one of the virtual displays. Of course, the user may also place respective control units in the virtual space. Each control unit may be coupled by the user to one of the measurement devices, or to the measurement server 320. The user may then control the measurement devices and the measurement server 320 by interacting with the control units in the virtual space.

In further embodiments, the measurement server 320 may provide additional functionality in addition to storing the measurement-related data and performing workflows.

The measurement server 320 may for example implement a device management system, that allows a user to monitor and manage a fleet of measurement devices and other measurement equipment. Further, the measurement server 320 may serve as general data storage for any kind of data from the measurement equipment that is managed via the measurement server 320.

In other embodiments, the measurement server 320 may also be implemented in the auxiliary measurement display device 300 or in the measurement device 332.

For sake of clarity in the following description of the method-based FIG. 4 the reference signs used in the description of apparatus-based FIGS. 1-3 and 6-7 will be maintained.

Figure 4:
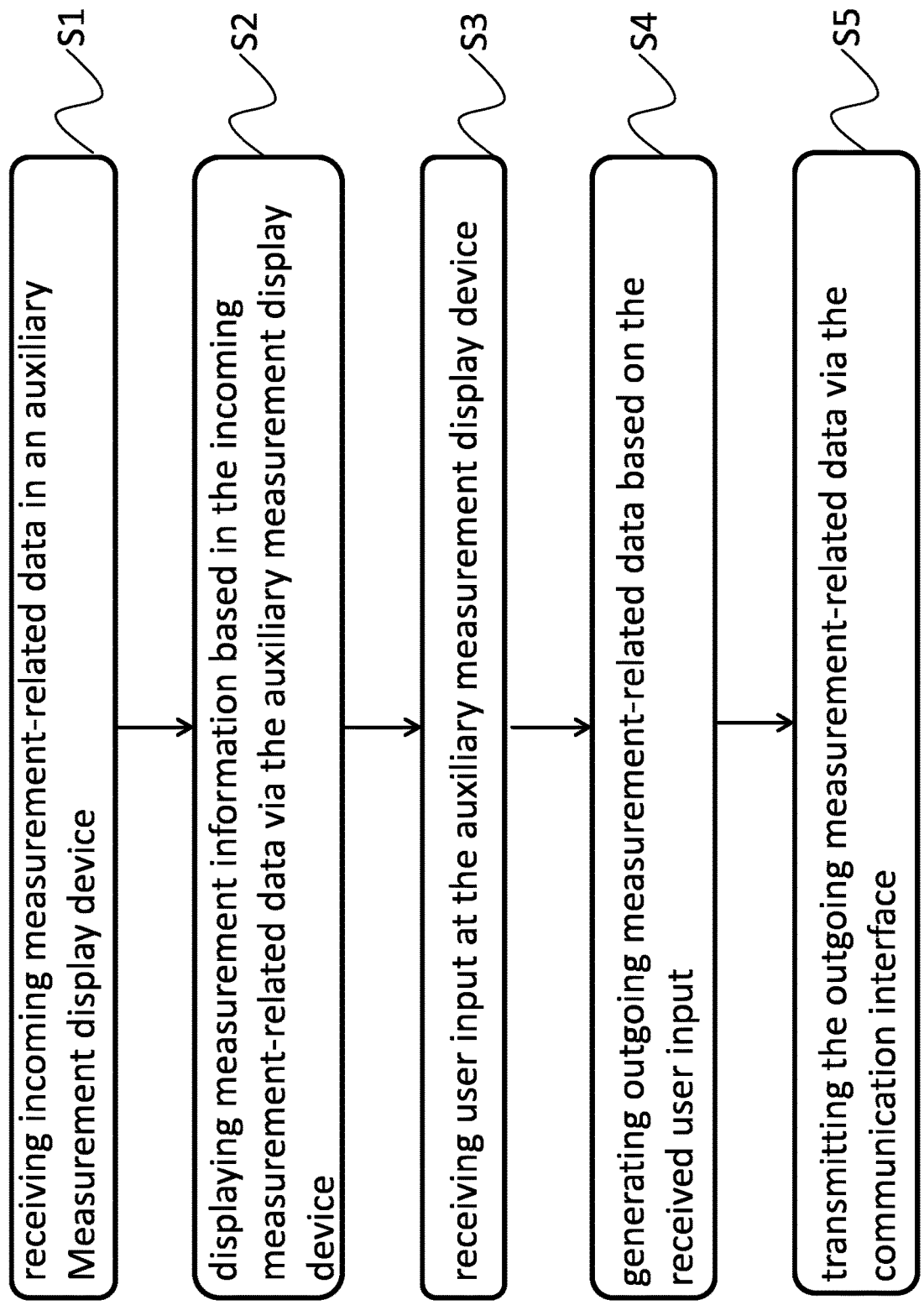
FIG. 4 shows a flow diagram of an embodiment of a method according to the present disclosure.

FIG. 4 shows a flow diagram of an embodiment of a method for controlling measurement equipment.

The method comprises receiving incoming measurement-related data 102 in an auxiliary measurement display device 100, 300, and displaying measurement information 106 based on the incoming measurement-related data 102 via the auxiliary measurement display device 100, 300.

The method further comprises receiving user input 109 at the auxiliary measurement display device 100, 300, generating outgoing measurement-related data 103 based on the received user input 109, and transmitting the outgoing measurement-related data 103 via the communication interface 101.

The method may also comprise displaying at least one of a measurement device list, and measurement result data, and measurement device configuration information. In addition, receiving user input 109 may comprise receiving at least one of a measurement device selection, and a measurement device configuration input, and a measurement device control instruction, and a measurement result storage instruction, and a measurement result data manipulation instruction.

Figure 5:
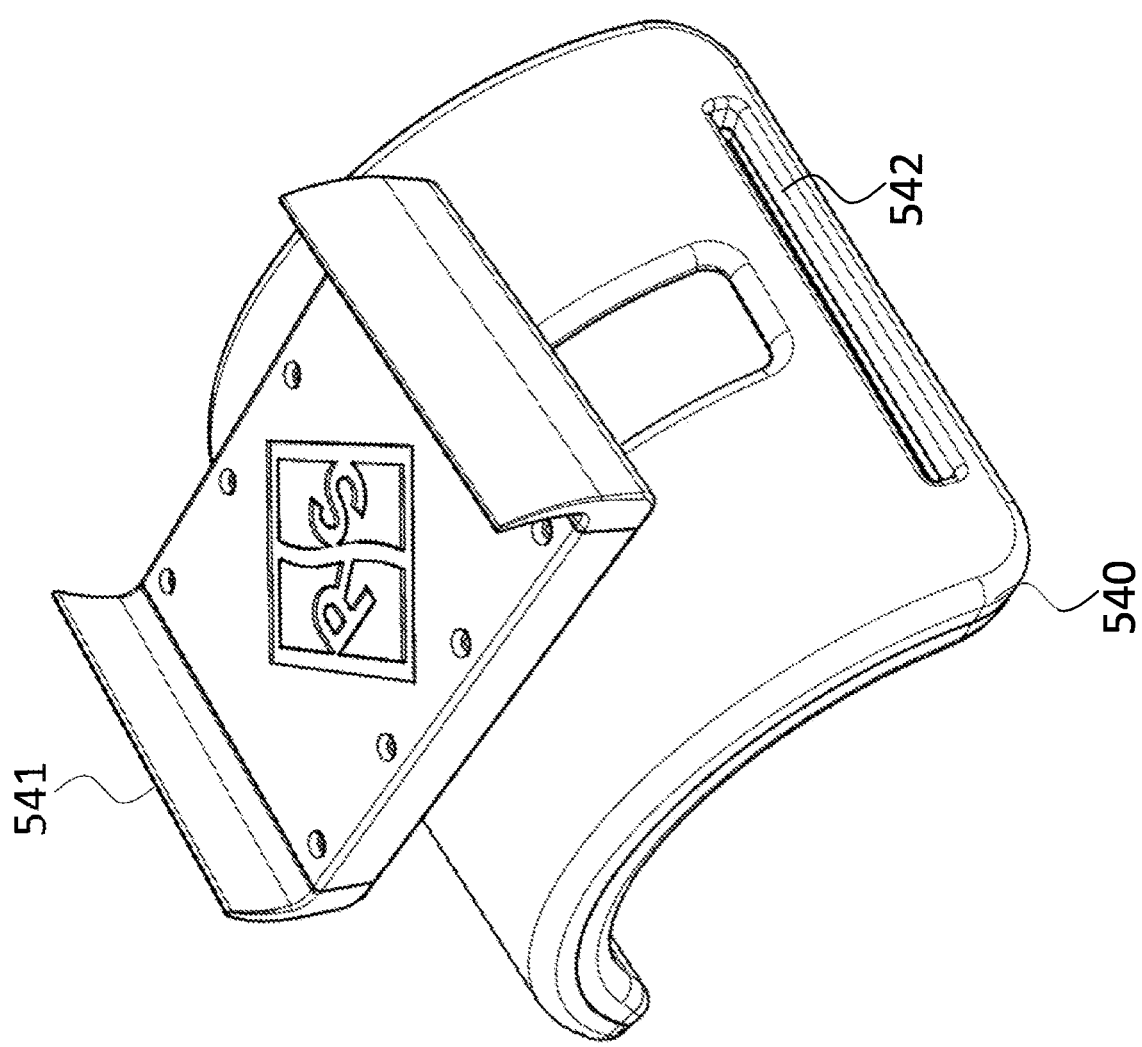
FIG. 5 shows a schematic diagram of an embodiment of a forearm support element and a device holder according to the present disclosure.

FIG. 5 shows a schematic diagram of a forearm support element 540 and a device holder 541 that may be used as holder for an auxiliary measurement display device.

The forearm support element 540 is shaped as a half-shell that may simply be put on a forearm of a user. In order to fix the forearm support element 540 to the user's arm, a slot 542 is provided along the front lower edge of the half-shell shaped forearm support element 540, and another—not visible—slot is provided on the back lower edge of the half-shell shaped forearm support element 540. To fix the forearm support element 540 to the user's forearm a belt may be inserted in the slots 542 and may be adjusted according to the size of the user's forearm.

The device holder 541 is movably attached to the forearm support element 540, such that the device holder 541 may be rotated and slid up and down on the forearm support element 540.

The device holder 541 is formed as a clamp-like element that may for example hold and clamp a smartphone or tablet PC. As will be shown in more detail in FIG. 6, the clamp-like device holder 541 is adjustable to accommodate different types of displays or mobile devices.

Although FIG. 5 shows the forearm support element 540 and the device holder 541, it is understood, that the device holder 541 may also be coupled to other supporting elements. Another supporting element may be formed for example, as a multi joint pivotable arm. Such an arm may comprise a clamp to fix a lower end of the arm to a table or desk, while the device holder 541 may be provided on the other end of the arm.

Figure 6:
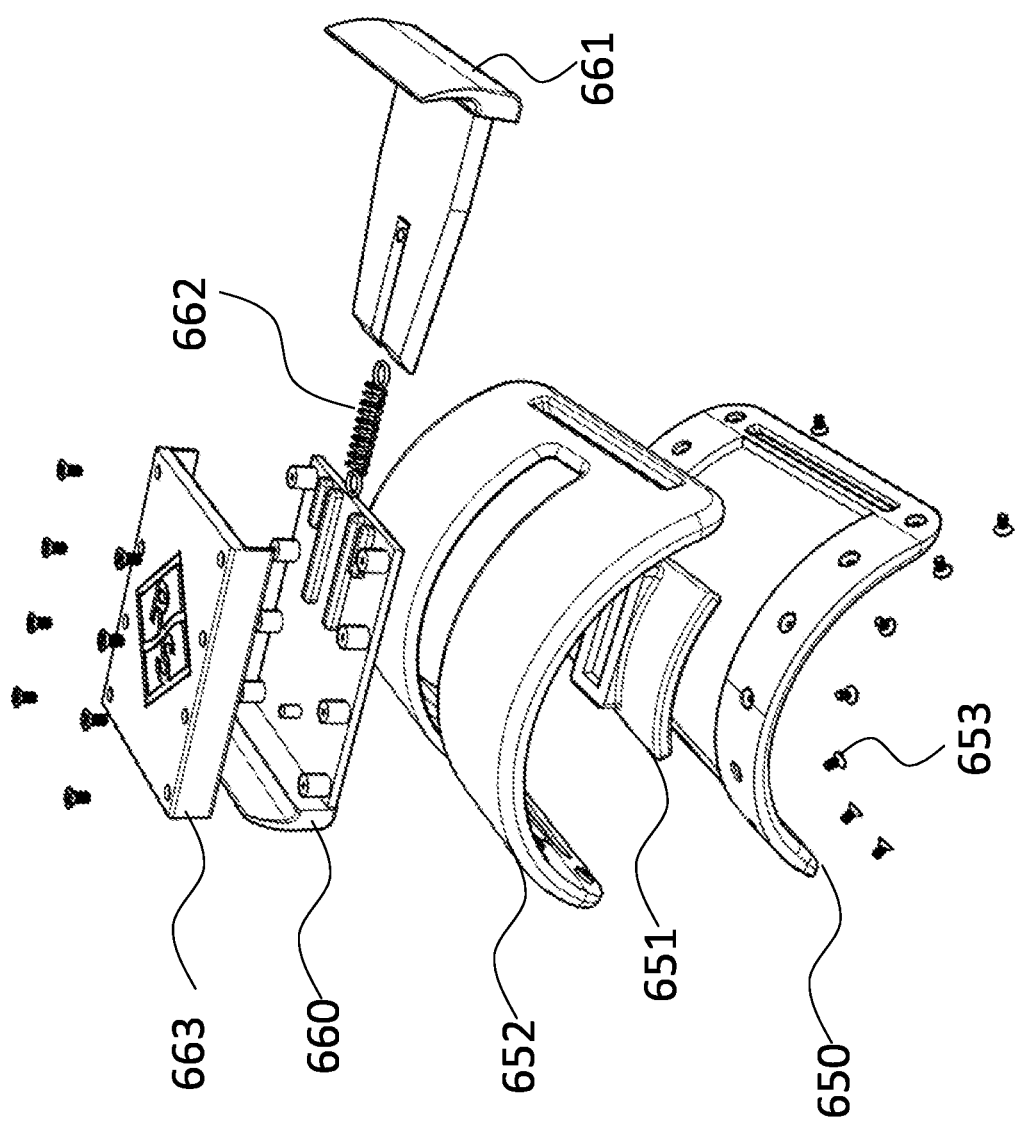
FIG. 6 shows the embodiment of a forearm support element and a device holder of FIG. 5 in an exploded view.

FIG. 6 shows the embodiment of a forearm support element and a device holder of FIG. 5 in an exploded view.

The forearm support element comprises a bottom hand rest shell 650, that is formed like a rounded or arc-like half-shell. An upper hand rest shell 652 that is also formed like a rounded or arc-like half-shell is provided as a cover or lid for the bottom hand rest shell 650. The bottom hand rest shell 650 and the upper hand rest shell 652 are exemplarily joined by a plurality of screws 653, while for sake of clarity only one of the screws is provided with a reference sign.

Between the bottom hand rest shell 650 and the upper hand rest shell 652 a rotary support 651 is provided. The rotary support 651 serves for movably coupling the forearm support element to the device holder.

The device holder comprises a lower device holder base 660, and a lid 663 that covers the device holder base 660. Between the device holder base 660 and the lid 663, a space is formed that is open to one side. Through the opening an adjustable clamp 661 is inserted in the open space. A spring 662 pulls the adjustable clamp 661 into the open space.

With the arrangement, the adjustable clamp 661 may be pulled out to accommodate displays or devices of different sizes. The spring 662 by pulling the adjustable clamp 661 into the space between the device holder base 660 and the lid 663 fixes any device with the clamp 661.

Figure 7:
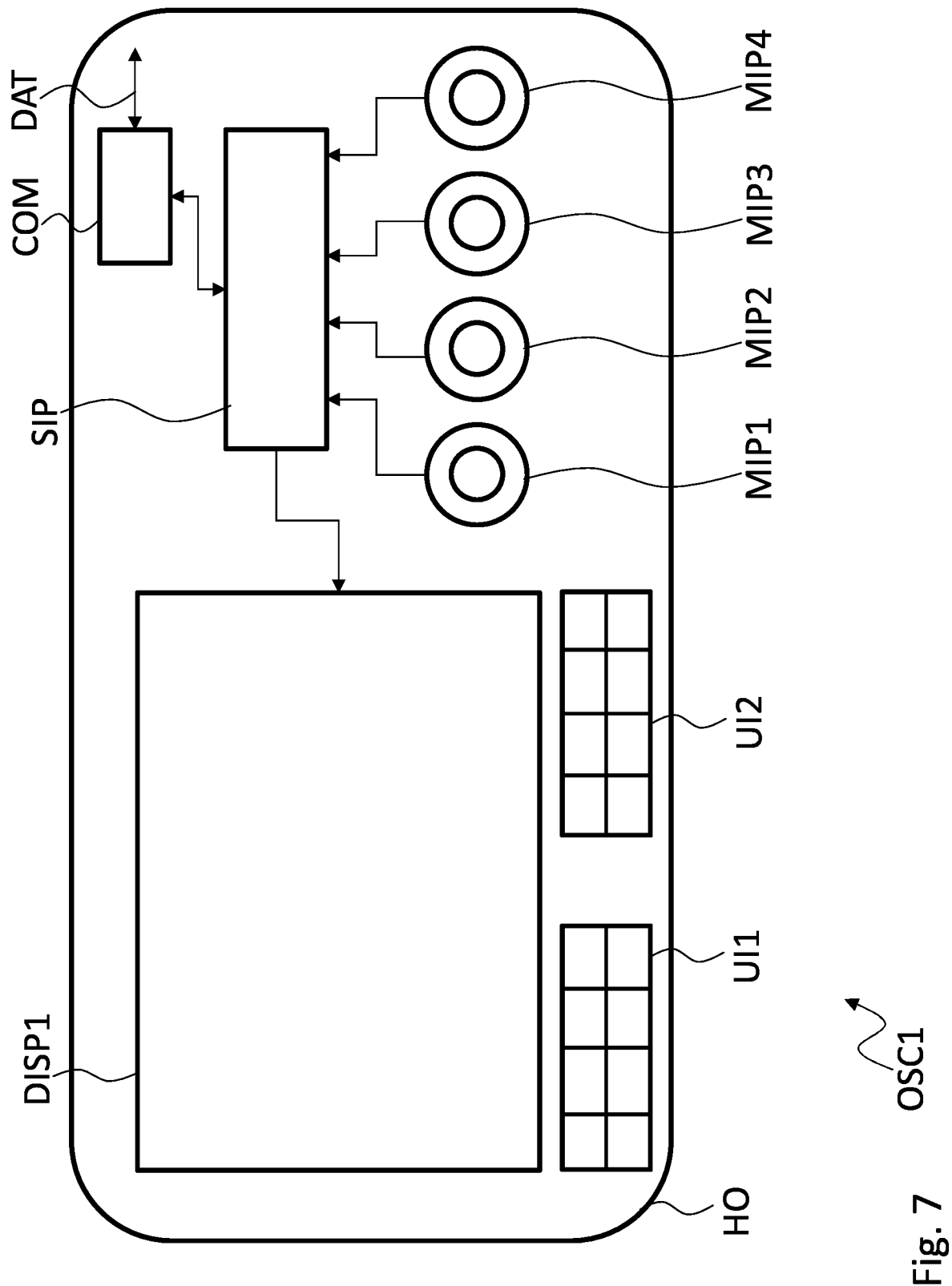
FIG. 7 shows a schematic diagram of an embodiment of an oscilloscope that may be used as a measurement device according to the present disclosure.

FIG. 7 shows a block diagram of an oscilloscope OSC1 that may be used as an embodiment of a measurement device according to the present disclosure.

The oscilloscope OSC1 comprises a housing HO that accommodates four measurement inputs MIP1, MIP2, MIP3, MIP4 that are coupled to a signal processor SIP for processing any measured signals. The signal processor SIP is coupled to a display DISP1 for displaying the measured signals to a user. The oscilloscope OSC1 further comprises a communication interface COM that is exemplarily coupled to the signal processor SIP, and user interfaces UI1, UI2, that are both formed as button or switch fields, each with eight buttons or switches. It is understood, that the user interfaces UI1, UI2 are exemplarily shown as button or switch fields, and may in other embodiments comprise any type of adequate user interface element.

Further it is understood, that in other embodiments, an additional controller or processor may be provided in the oscilloscope OSC1, that performs general user interface and communication functions instead of the signal processor SIP.

During operation in a measurement system according to the present disclosure, the oscilloscope OSC1 may mainly serve as a measurement device that acquires measurement data. The oscilloscope OSC1 may for example, also output trigger signals or any other test signal to be provided to a device under test.

The oscilloscope OSC1 may be controlled manually by a user. Further, within the measurement system, the oscilloscope OSC1 may be remotely controlled. For example, a user with an auxiliary measurement display device may control the oscilloscope OSC1 via the auxiliary measurement display device. As alternative or in addition, a controller of a measurement server may control the oscilloscope OSC1, especially when executing a workflow.

While being remotely controlled, the oscilloscope OSC1 may receive and transmit measurement-related data DAT. The measurement-related data DAT may for example comprise control data that is received for controlling the oscilloscope OSC1. The measurement-related data DAT may also comprise measurement data that is captured by the oscilloscope OSC1 and transmitted via the communication interface COM. The measurement-related data DAT may also comprise image data, like screenshots of the content shown on the display DISP1.

In embodiments, the oscilloscope OSC1 may itself serve as auxiliary measurement display device or measurement server. In such embodiments, control data may be provided by the oscilloscope OSC1 to other measurement devices. A user may control the measurement system via the user interfaces UI1, UI2 of the oscilloscope OSC1.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

LIST OF REFERENCE SIGNS 100, 300 auxiliary measurement display device
101 communication interface 102 incoming measurement-related data
103 outgoing measurement-related data
105 display
106 measurement information
108 user interface
109 user input
112 controller
220, 320 measurement server
221 server communication interface
224 database
225 measurement-related data
227 controller
330 measurement system
331 database
332 measurement device
333-1, 333-2, 333-3, 333-4 firewall
334 network
S1, S2, S3, S4, S5 method steps
540 forearm support element
541 device holder
542 slot
650 bottom hand rest shell
651 rotary support
652 upper hand rest shell
653 screws
660 device holder base
661 adjustable clamp
662 spring
663 lid
OSC1 oscilloscope
HO housing
MIP1, MIP2, MIP3, MIP4 measurement input
SIP signal conditioning
DISP1 display
UI1, UI2 user interface
COM communication interface
DAT measurement-related data

What is claimed is:

1. An auxiliary measurement display device for receiving data or results regarding electric, magnetic, or electromagnetic signals to be measured from a device under test, comprising:
a communication interface configured to receive incoming measurement-related data and transmit outgoing measurement-related data;
a display configured to display measurement information;
a user interface configured to receive user input;
a controller coupled to the communication interface and the display and the user interface;
wherein the controller is configured to:
control the display to display the measurement information based on the incoming measurement-related data, and
generate the outgoing measurement-related data based on the received user input and transmit the outgoing measurement-related data via the communication interface, including to control execution of a measurement workflow, the measurement workflow comprising commands that define the measurement workflow and refer to single steps that are to be performed in a specific order to complete a measurement workflow, by:
loading a definition of one of multiple measurement workflows from a measurement server or a memory of the auxiliary measurement display device for execution, a configuration having been previously read from a measurement device and having been stored as parameters in a configuration command by a user; and
executing the commands of the workflow, including applying the configuration to the measurement device; and
a device holder, wherein the device holder is configured to be coupled to a forearm support element that is configured to being releasably attached to a forearm of the user or to be coupled to a support element that is configured to be releasably attached to a supporting structure, wherein the device holder includes an adjustable clamp biased by a spring to accommodate devices of different sizes, the adjustable clamp being inserted into a space formed between a device holder base and a lid.

2. The auxiliary measurement display device of claim 1, wherein the measurement device comprises at least one of:
a signal acquisition device;
an oscilloscope;
digital oscilloscope;
a vector network analyzer;
a signal generation device;
a signal generator;
an arbitrary signal generator; or
a vector signal generator.

3. The auxiliary measurement display device of claim 1, wherein in an arrangement with multiple measurement devices the user receives the incoming measurement-related data centrally with the auxiliary measurement display device for all related measurement devices.

4. The auxiliary measurement display device of claim 1, wherein the measurement information comprises a measurement device list with only such measurement devices that are included in a respective test setup,
wherein the user defines the respective test setup that only includes some of the measurement devices with the auxiliary measurement display device.

5. The auxiliary measurement display device of claim 1, wherein the sets are provided with additional information that comprises at least one of descriptions and images of how to connect the measurement equipment and the device under test.

6. The auxiliary measurement display device of claim 1, wherein the user selects one of multiple measurement workflows that are stored in the measurement server or the auxiliary measurement display device via the auxiliary measurement display device, wherein the auxiliary measurement display device may then control the measurement server to execute the respective workflow or execute the respective workflow directly.

7. The auxiliary measurement display device of claim 1, wherein a definition of the workflow comprises a data measurement plan or guide that lists the single steps that are required to perform the respective workflow, and when executing the workflow, the controller performs all steps of the data measurement plan or guide as indicated.

8. The auxiliary measurement display device of claim 1, wherein at least one of the steps requires a user input, and wherein that step indicates if the controller is to suspend the workflow until the step user input is received or not.

9. The auxiliary measurement display device of claim 1, wherein the measurement server provides a workflow editor to the user, wherein the workflow editor allows the user to graphically or textually define the single steps of the workflow.

10. The auxiliary measurement display device of claim 1, wherein the controller is configured to:

request image data from the measurement device, the image data representing a current screen of the measurement device as a screenshot; and execute predefined or user-defined workflows, the workflows comprising steps for transmitting configuration commands, transmitting control commands, requesting measurement data, and evaluating received data, wherein a step comprises generating a documentation based on at least one of the transmitted configuration commands, and the transmitted control commands, and the requested measurement data, and the requested image data, and wherein the documentation is generated based on document templates that are filled with required data by a respective templating engine.

11. The auxiliary measurement display device of claim 10, wherein the document templates are filled with information about a setup of the measurement system, with information about the configuration of the single measurement devices, with information and screenshots of the measured data, and with evaluation results regarding the measured data.

12. The auxiliary measurement display device of claim 1, wherein the forearm support element comprises a clamp formed with a longitudinal opening or slot from a flexible material for the user to push open a top of the clamp to insert the forearm of the user.

13. The auxiliary measurement display device of claim 1, wherein the device holder is configured to rotate and slide along the forearm support element, allowing adjustable positioning of the auxiliary measurement display device.

14. The auxiliary measurement display device of claim 1, wherein the forearm support element comprises a bottom hand rest shell and an upper hand rest shell joined together, the shells enclosing a rotary support configured to enable rotation of the device holder relative to the forearm support element.

15. An auxiliary measurement display device for receiving data or results regarding electric, magnetic, or electromagnetic signals to be measured from a device under test, comprising:
   a communication interface configured to receive incoming measurement-related data and transmit outgoing measurement-related data;
   a display configured to display measurement information;
   a user interface configured to receive user input;
   a controller coupled to the communication interface and the display and the user interface;
   wherein the controller is configured to:
      control the display to display the measurement information based on the incoming measurement-related data, and
      generate the outgoing measurement-related data based on the received user input and transmit the outgoing measurement-related data via the communication interface, including to control execution of a measurement workflow, the measurement workflow comprising commands that define the measurement workflow and refer to single steps that are to be performed in a specific order to complete a measurement workflow, by:
         loading a definition of one of multiple measurement workflows from a measurement server or a memory of the auxiliary measurement display device for execution, a configuration having been previously read from a measurement device and having been stored as parameters in a configuration command by a user; and
         executing the commands of the workflow, including applying the configuration to the measurement device; and
   a device holder, wherein the device holder is configured to be coupled to a forearm support element that is configured to being releasably attached to a forearm of the user or to be coupled to a support element that is configured to be releasably attached to a supporting structure, wherein the device holder is adapted to be coupled to a multi-joint pivotable arm with a clamp for securing a lower end of the arm to a table or desk, with the device holder positioned at the other end of the arm.

16. The auxiliary measurement display device of claim 15, wherein the measurement device comprises at least one of:
   a signal acquisition device;
   an oscilloscope;
   digital oscilloscope;
   a vector network analyzer;
   a signal generation device;
   a signal generator;
   an arbitrary signal generator; or
   a vector signal generator.

17. The auxiliary measurement display device of claim 15, wherein in an arrangement with multiple measurement devices the user receives the incoming measurement-related data centrally with the auxiliary measurement display device for all related measurement devices.

18. The auxiliary measurement display device of claim 15, wherein the measurement information comprises a measurement device list with only such measurement devices that are included in a respective test setup,
   wherein the user defines the respective test setup that only includes some of the measurement devices with the auxiliary measurement display device.

19. The auxiliary measurement display device of claim 15, wherein the sets are provided with additional information that comprises at least one of descriptions and images of how to connect the measurement equipment and the device under test.

20. The auxiliary measurement display device of claim 15, wherein the user selects one of multiple measurement workflows that are stored in the measurement server or the auxiliary measurement display device via the auxiliary measurement display device, wherein the auxiliary measurement display device may then control the measurement server to execute the respective workflow or execute the respective workflow directly.

21. The auxiliary measurement display device of claim 15, wherein a definition of the workflow comprises a data measurement plan or guide that lists the single steps that are required to perform the respective workflow, and when executing the workflow, the controller performs all steps of the data measurement plan or guide as indicated.

22. The auxiliary measurement display device of claim 15, wherein at least one of the steps requires a user input, and wherein that step indicates if the controller is to suspend the workflow until the step user input is received or not.

23. The auxiliary measurement display device of claim 15, wherein the measurement server provides a workflow editor to the user, wherein the workflow editor allows the user to graphically or textually define the single steps of the workflow.

24. The auxiliary measurement display device of claim 15, wherein the controller is configured to:

request image data from the measurement device, the image data representing a current screen of the measurement device as a screenshot; and execute predefined or user-defined workflows, the workflows comprising steps for transmitting configuration commands, transmitting control commands, requesting measurement data, and evaluating received data, wherein a step comprises generating a documentation based on at least one of the transmitted configuration commands, and the transmitted control commands, and the requested measurement data, and the requested image data, and wherein the documentation is generated based on document templates that are filled with required data by a respective templating engine.

25. The auxiliary measurement display device of claim 24, wherein the document templates are filled with information about a setup of the measurement system, with information about the configuration of the single measurement devices, with information and screenshots of the measured data, and with evaluation results regarding the measured data.

26. The auxiliary measurement display device of claim 15, wherein the forearm support element comprises a clamp formed with a longitudinal opening or slot from a flexible material for the user to push open a top of the clamp to insert the forearm of the user.

27. The auxiliary measurement display device of claim 15, wherein the device holder is configured to rotate and slide along the forearm support element, allowing adjustable positioning of the auxiliary measurement display device.

28. The auxiliary measurement display device of claim 15, wherein the forearm support element comprises a bottom hand rest shell and an upper hand rest shell joined together, the shells enclosing a rotary support configured to enable rotation of the device holder relative to the forearm support element.

* * * * *